July 27, 1926.                                                    1,594,065
                         J. C. MacLACHLAN
     METHOD AND APPARATUS FOR REDUCING HEAVY LIQUID SUBSTANCES TO
                      DRY FINELY POWDERED FORM
                Original Filed August 2, 1920     2 Sheets-Sheet 1

Fig. 1

INVENTOR
John C. MacLachlan
BY HIS ATTORNEYS
Williamson Muchant

July 27, 1926.
J. C. MacLACHLAN
1,594,065
METHOD AND APPARATUS FOR REDUCING HEAVY LIQUID SUBSTANCES TO
DRY FINELY POWDERED FORM
Original Filed August 2, 1920    2 Sheets-Sheet 2
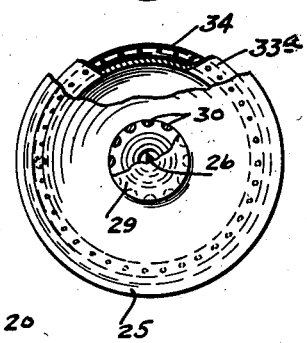
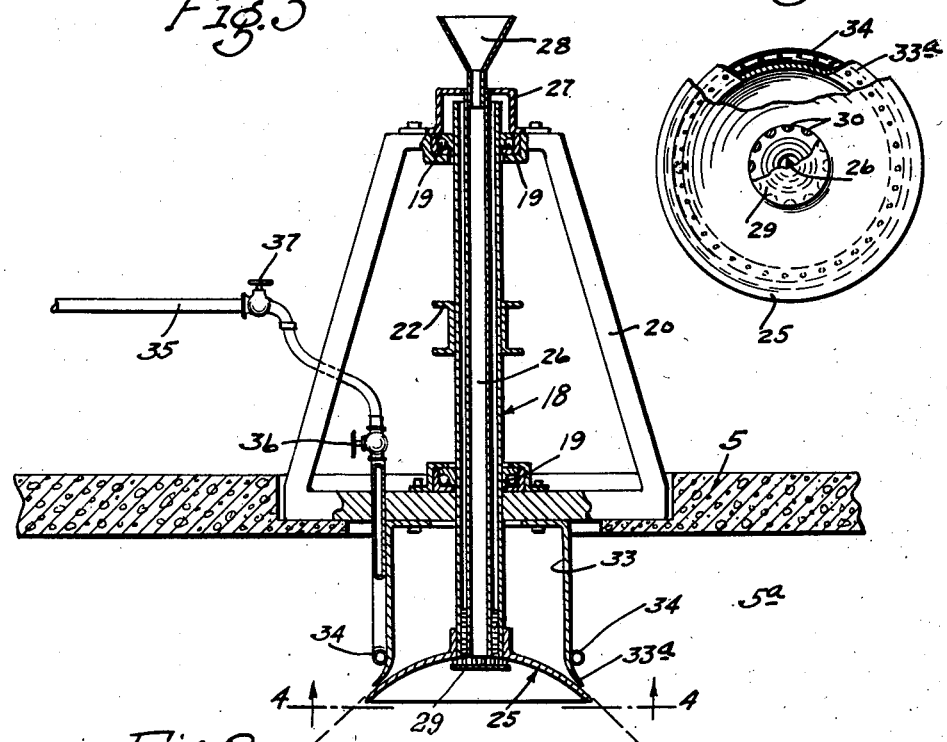
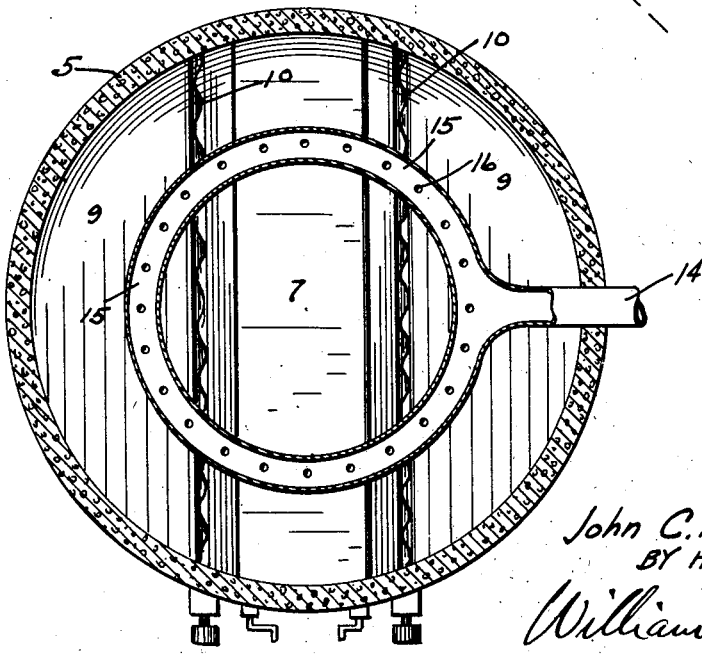

Patented July 27, 1926.

1,594,065

UNITED STATES PATENT OFFICE.

JOHN C. MacLACHLAN, OF CHICAGO, ILLINOIS.

METHOD AND APPARATUS FOR REDUCING HEAVY LIQUID SUBSTANCES TO DRY FINELY-POWDERED FORM.

Continuation of application Serial No. 400,571, filed August 2, 1920. This application filed July 5, 1924. Serial No. 724,474.

My present invention has for its special object the provision of an improved method and apparatus or device for use in reducing heavy fluid or semi-fluid substances to dry powdered granular or finely divided form. One of the uses of this improved apparatus or device is to produce an oatmeal breakfast food that may be very quickly prepared for the table, and though not limited to this use, its use will be described in that connection for the purpose of illustration.

The best oatmeal breakfast foods now on sale and which, of course, have been partially cooked, require as much as twenty minutes for warming to complete the cooking to make the same ready to serve. Oatmeal breakfast food prepared by the use of my improved apparatus can be prepared for table use simply by bringing the same to a boil or by pouring boiling water onto it, and moreover, the product thus prepared is a superior breakfast food.

Before the oatmeal, for example, is treated with the improved apparatus, it will first be boiled until it is thoroughly cooked and then, while in a semifluid condition, will be fed to the spraying head of my improved apparatus. This spraying head is arranged to rotate and to discharge the cooked oatmeal, then in the form of gruel, in an umbrella-like film, within a drying chamber containing a drying medium, such as hot air. As the film of gruel is projected by centrifugal force from the periphery of the spraying head, a film of dry or superheated steam is projected through the same and this thoroughly disintegrates the material and very greatly raises the temperature of the particles of the meal. Just after the film of dry steam is projected through the film of gruel or meal, a blast of hot air is blown through the same, and thereby, the particles of the meal are quickly dried. The actions just noted are preferably produced at the top of a large and deep drying chamber, so that by the time the particles reach the bottom of the drying chamber, they will be in dry solid but spongy condition and will not cohere or stick together. The particles of the meal will vary in size considerably, but the dry product will be of a character that may be termed a coarse granular condition, that is, this substance will usually be considerably coarser than coarsely ground corn meal, as commercially sold.

The apparatus above described in a general way is illustrated in the accompanying drawings wherein like characters indicate like parts throughout the several views.

Referring to the drawings:

Fig. 1 is a vertical axial section illustrating the apparatus, some parts being shown in full;

Fig. 2 is a horizontal section taken on the line 2—2 of Fig. 1;

Fig. 3 is an axial vertical section of the spraying head and associated parts showing the same on a large scale than in the other views; and Fig. 4 is a bottom plan view with some parts broken away, showing elements of a spraying head that are in the immediate vicinity of the line marked 4—4 on Fig. 3.

The numeral 5 indicates a large drying chamber which, to illustrate, may be assumed to be about twenty feet in height, solidly built upon a basement floor, or the like. Extended diametrically through the lower portion of the drying chamber 5 but above the bottom thereof, is a runway 6, which, as shown, supports a platform 7 and is provided with screen sides 8, which latter afford air outlets. Located on each side of the runway 6 is a hopper 9, and at the bottom of each hopper, a spiral feed screw 10. The hoppers 9, screens 8 and platform 7 divide the drying chamber 5 into a main upper compartment 5ª and a lower secondary compartment or chamber 5ᵇ. From the compartment 5ᵇ extends an air outlet pipe 11 that is connected to the casing of a suction fan 12.

The numeral 13 indicates an air heater, the outlet stack 14 of which extends into the top of the main chamber 5ª and is connected to an annular hot air discharge blast pipe 15, which latter, as shown, is secured to the top of the chamber 5 and is provided in its underside with a multiplicity of hot air discharge passages 16 that will discharge an annular blast of hot air downward into the drying chamber.

The spraying head or device above described in a general way is located at the center of the annular hot air blast pipe 15, and comprises an upright tubular spindle 18, which, by ball bearings 19, is journaled to a bearing bracket 20 secured on the top of the drying chamber. This spindle 18 is adapted to be driven by a belt 21 that runs over a pulley 22 on said spindle and over a pulley 23 on the armature shaft of a small high speed electric motor 24.

Secured to the lower end of the tubular spindle 18 is a spraying head in the form of a concavo-convex disk 25, the convex side of which is downward. The numeral 26 indicates a smaller tube located within the rotary tubular spindle 18 but held at its upper end against rotation, by a supporting cap 27 that is secured to the bracket 20. The numeral 28 indicates a funnel that delivers into the upper end of the nonrotary feed tube 26. The lower end of the feed tube 26 delivers into the hollow discharge head 29 that is secured to the underside of the concave spraying head or disk 25. This hollow discharge head 29 is formed by a bottom plate that is connected to the disk 25 by circumferentially spaced lugs 30 shown in section in Fig. 4.

The gruel or cooked cereal may be placed in a vat or tank 31 suitably supported and provided with a faucet 32, or the like, controlling the discharge thereof into the funnel 28.

The numeral 33 indicates an approximately cylindrical steam deflector that is secured in its upper end to the bracket 20, is located concentrically around the rotary spindle 18 and has a slightly outward lower deflecting edge 33ª that is concentric to and spaced but slightly from the outer edge of a spraying disk 25.

The numeral 34 indicates an annular steam nozzle that surrounds the deflector 33 just above its lower edge 33ª and is perforated at its underside for the discharge of steam. The numeral 35 indicates a steam supply pipe which leads from a suitable source of dry or high pressure steam, and is connected to the steam nozzle pipe 34. As shown, the steam pipe 34 is provided with two manually operated controlling valves 36 and 37.

The operation of the apparatus briefly summarized is substantially as follows:

The cooked gruel or food in heavy liquid condition will be delivered into the faucet of the funnel 28 and will run through the non-rotary feed tube 26 into the discharge head 29, and, under rotation of the latter, will, by centrifugal force, be thrown against the concave lower surface of a spraying disk 25. The material will be thrown outwardly from the undersurface of disk 25 and, owing to the concave form of this undersurface, the material will be directed downwardly and also will be thrown outwardly so that the same will be discharged in the form of an umbrella-shaped film-like shower. The blast of steam issuing from the holes in pipe 34 will pass downwardly through this film or shower and the particles of the substance will be heated and separated by the compact of the steam so that the material will be finely disintegrated. The blast of hot air from the conduit 15 will encounter the separated particles and the latter will be quickly and practically instantaneously dried and precipitated in the bottom of the hoppers 9. This precipitated material will be in the form of a granular food substance comprising dried and separated particles.

The dried coarse granular food product caught in the hoppers 9 may be fed out of the hoppers by the spiral conveyers 10, but this feature, however, constitutes no part of the present invention.

The projection of the wet food substance in the form of a thin film or spray presents the same to a hot drying medium in such condition that it may be quickly and evenly dried. By the film of dry high temperature or superheated steam, the substance is thoroughly disintegrated, rendering it possible to quickly dry the same. The temperature of the thin film of food substance will also be raised to such a degree that the drying thereof, even by natural cooling action in air under atmospheric conditions, would be rapid, but in the presence of the drying medium or air, this drying takes place almost instantaneously. These facts have been demonstrated in actual practice. The steam used as above set forth acts to disintegrate the material and also to heat the same. The steam, therefore, forms a very effective disintegrating means. Without the breaking up, beating or disintegrating action it is impossible to quickly and properly dry the material.

This application is a continuation of applicant's copending application filed August 2, 1920, S. N. 400,571.

It will, of course, be understood that various changes may be made in the form, details, arrangement and proportion of the apparatus and in the sequence of steps of the method, without departing from the scope of applicant's invention, which, generally stated, consists in such a method and apparatus as described and illustrated and defined in the appended claims.

What is claimed is:

1. The process of converting semi-fluid material into dry finely divided form comprising forcibly and centrifugally projecting said material substantially horizontal outwardly in an open heated chamber to form a thin umbrella-like shower and passing a blast of steam downwardly through said shower whereby said material is disintegrated and heated and carried downwardly by said steam and gravity.

2. The process of converting semi-fluid material into a dry finely divided form comprising centrifugally projecting said material substantially horizontally at high speed in a casing having an uninterrupted interior to form an umbrella-like shower and passing a blast of superheated steam downwardly therethrough to disintegrate and heat said material.

3. An apparatus for converting semifluid material into dry finely divided form comprising a casing having an open unobstructed interior, means for centrifugally projecting said material horizontally outwardly at the top of said chamber in an umbrella-like shower, and means for passing a blast of superheated steam downwardly through said shower.

4. An apparatus for converting semi-fluid material into dry finely divided form comprising a closed casing having an open unobstructed interior, means at the top central portion thereof for centrifugally projecting said material horizontally outwardly in a thin umbrella-like shower, and means outwardly of and above said means for passing a substantially annular blast of heated air downwardly through said shower.

5. The process of converting semi-fluid material into dry finely divided form comprising projecting said material centrifugally, in an open unobstructed chamber, forcibly directing a current of heated disintegrating medium downwardly through said projected material and also directing a current of heated drying medium through said material outward of said first mentioned current.

6. The process of converting semi-fluid material into dry finely divided form, comprising projecting said material centrifugally in an open unobstructed heated chamber and directing a current of steam downwardly through said projected material and also directing a current of heated drying medium downwardly through said material outward of said first mentioned current.

7. The process of converting semi-fluid material into dry finely divided form, comprising projecting said material centrifugally and directing a current of superheated steam downwardly through said projected material and also directing a current of hot air through said material outward of said first mentioned current.

8. In a device of the class described, the combination with a rotary discharge head adapted under the action of centrifugal force to project heavy fluid substances in the form of a radial umbrella-like shower, means for projecting an annular blast of superheated steam downwardly through said shower to heat and divide the particles thereof.

9. The combination set forth in claim 8, and means for projecting an annular blast of hot drying medium downwardly through said shower outside of said blast of steam.

10. In a device of the kind described, the combination with an upright rotary tubular spindle, of a discharge head in the form of a disk that is concave in its underside and rotates with and receives from the lower end of said spindle and is thereby adapted to project an umbrella-like film-like shower under the action of centrifugal force, and an annular nozzle located immediately above said discharge head and surrounding said spindle and adapted to project an annular film-like blast of superheated steam downwardly through the first noted film immediately as it passes from the periphery of said discharge head.

11. In a device of the kind described, the combination with an upright rotary tubular spindle, of a discharge head in the form of a disk that is concave in its underside and rotates with and receives from the lower end of said spindle and is thereby adapted to project an umbrella-like film-like shower under the action of centrifugal force, a non-rotary annular shield surrounding the lower portion of said spindle and terminating in a flange located adjacent to the periphery of said discharge head, and an annular discharge nozzle surrounding the lower portion of said shield and adapted to project an annular film-like blast of steam downwardly through said first noted shower immediately as it passes from the periphery of said discharge head.

12. In a device of the kind described, the combination with a rotary discharge head adapted under the action of centrifugal force, to project heavy fluid substances substantially horizontally outwardly in the form of a film-like shower, of means for projecting a hot drying and disintegrating medium in the form of a film-like blast of steam directly downwardly through the first noted film-like shower, and means for discharging a substantially annular blast of hot air downwardly through the said first noted shower outward of the line where the steam has been passed therethrough.

13. In a device of the kind described, the combination with an upright rotary tubular spindle, of a discharge head in the form of a disk that is concave in its underside and rotates with and receives from the lower end of said spindle and is thereby adapted to project an umbrella-like film-like shower under the action of centrifugal force, an annular nozzle located immediately above said discharge head and surrounding said spindle and adapted to project an annular film-like blast of superheated steam through the first noted shower immediately as it passes from the periphery of said discharge head, and means for discharging a substantially annular blast of hot air through the said first noted shower outward of the line where the steam has been passed therethrough.

14. In a device of the kind described, the combination with an upright rotary tubular spindle, of a discharge head in the form of a disk that is concave in its underside and rotates with and receives from the lower end of said spindle and is thereby adapted to project an umbrella-like film-like shower under the action of centrifugal force, a non-rotary annular shield surrounding the lower portion of said spindle and terminating in a flange located adjacent to the periphery of said discharge head, an annular discharge nozzle surrounding the lower portion of said spindle and adapted to project an annular film-like blast of steam through said first noted shower immediately as its passes from the periphery of said discharge head, and an annular hot air discharge pipe located outward of but concentric to said discharge head and steam nozzle and arranged to deliver a substantially annular downward blast of air.

In testimony whereof I affix my signature.

JOHN C. MacLACHLAN.